United States Patent [19]

Tanaka

[11] Patent Number: 5,140,439
[45] Date of Patent: Aug. 18, 1992

[54] FACSIMILE COMMUNICATION METHOD AND FACSIMILE MACHINE

[75] Inventor: Shigetaka Tanaka, Atsugi, Japan

[73] Assignee: Ricoh Company, Ltd., Tokyo, Japan

[21] Appl. No.: 399,986

[22] Filed: Aug. 29, 1989

[30] Foreign Application Priority Data

Sep. 6, 1988 [JP] Japan ................. 63-223884

[51] Int. Cl.$^5$ ............................................. H04N 1/00
[52] U.S. Cl. ................... 358/405; 358/434; 358/435
[58] Field of Search ............ 358/405, 434, 435, 436, 358/440, 474, 476; 379/100

[56] References Cited

U.S. PATENT DOCUMENTS

| | | | |
|---|---|---|---|
| 4,110,558 | 3/1990 | Kageyama et al. | 371/5 |
| 4,158,416 | 5/1979 | Miwa et al. | 358/439 |
| 4,589,111 | 5/1986 | Adachi | 371/32 |
| 4,601,535 | 7/1906 | Marzec et al. | 371/32 |
| 4,630,126 | 12/1986 | Kake et al. | 358/438 |
| 4,654,718 | 3/1987 | Sueyoshi | 358/440 |
| 4,680,773 | 7/1987 | Amundson | 375/121 |
| 4,710,925 | 12/1987 | Negi | 371/5 |
| 4,779,074 | 10/1988 | Takiuashi et al. | 371/32 |
| 4,847,891 | 7/1989 | Kotani | 358/440 |
| 4,956,860 | 9/1990 | Murata | 379/100 |

FOREIGN PATENT DOCUMENTS 60-70874  4/1985  Japan ................. 358/440

*Primary Examiner*—Edward L. Coles, Sr.
*Assistant Examiner*—Thomas D. Lee
*Attorney, Agent, or Firm*—Oblon, Spivak, McClelland, Maier & Neustadt

[57] ABSTRACT

A facsimile communication method includes the steps of transmitting image information from a transmitter facsimile machine to a receiver facsimile machine through a transmission line, determining whether the receiver facsimile machine is successful in receiving the transmitted image information, sending a first station related to the transmitter facsimile machine a first voice message from the transmitter facsimile machine when the receiver facsimile machine is successful in receiving the transmitted image information, and sending a second station related to the receiver facsimile machine a second voice message from the receiver facsimile machine when the receiver facsimile machine has failed to receive the transmitted image information.

15 Claims, 2 Drawing Sheets

FACSIMILE COMMUNICATION METHOD AND FACSIMILE MACHINE

BACKGROUND OF THE INVENTION

The present invention generally relates to a facsimile communication method, and more particularly to a facsimile communication method in which a facsimile machine informs a predetermined telephone of the results of the facsimile communication. The present invention further relates to a facsimile machine suitable for the above-mentioned facsimile communication method.

Currently, a facsimile machine is widely used and is provided with enhanced functions. As the functions of a facsimile machine are enhanced, various convenient facsimile communication procedures become available.

In a proposed facsimile communication method, a predetermined telephone provided in a destination (reception side) or a source (transmission side) is informed of the results of the facsimile communication. This method is further described by referring to FIG. 1. When a facsimile communication from a transmitter facsimile machine 31 to a receiver facsimile machine 34 has been completed, the transmitter facsimile machine 31 sends a voice message announcing completion of facsimile communication to a transmission side telephone 32 and a reception side telephone 33, which have been registered in the transmitter facsimile machine 31. Thus, an operator on the transmission side can know when completion of the facsimile transmission occurs through the announced voice message. On the other hand, an operator on the reception side can confirm the reception results through the voice message, and may request retransmission of image information when reception fails.

However, the above-mentioned facsimile communication method has a disadvantage in that the cost of sending the facsimile communication results runs up because the results are sent to both the transmission side telephone 31 and the reception side telephone 33 from the transmitter facsimile machine 31. As the transmission side telephone 32 or the reception side telephone 33 is far from the transmitter facsimile machine 31, the cost of sending the facsimile communication results increases.

SUMMARY OF THE INVENTION

Accordingly, a general object of the present invention is to provide an improved facsimile communication method in which the aforementioned disadvantages are eliminated.

A more specific object of the present invention is to reduce the cost of sending the results of the facsimile communication.

The above objects of the present invention can be achieved by a facsimile communication method comprising the steps of transmitting image information from a transmitter facsimile machine to a receiver facsimile machine through a transmission line, determining whether the receiver facsimile machine is successful in receiving the transmitted image information, sending to a first station related to the transmitter facsimile machine a first voice message from the transmitter facsimile machine when the receiver facsimile machine is successful in receiving the transmitted image information, and sending to a second station related to the receiver facsimile machine a second voice message from the receiver facsimile machine when the receiver facsimile machine has failed to receive the transmitted image information.

Another object of the present invention is to provide a facsimile machine suitable for the above-mentioned facsimile communication method.

This object of the present invention can be achieved by a facsimile machine comprising scanning means for scanning a document and outputting image information, memory means for storing a telephone number of a first station related to the present facsimile machine and a telephone number of a second station related to a receiver facsimile machine, and voice message generating means for generating a voice message to be used when the receiver facsimile machine is successful in receiving the image information. The present invention further comprises communication means for exchanging data with a transmission line to which the present facsimile machine and the receiver facsimile machine are coupled, the image information and the telephone number of the second station being transmitted to the receiver facsimile machine through the communication means and the transmission line, recording means for recording image information received through the communication means on a recording medium, and voice message outputting means for reading out the telephone number of the first station stored in the memory means and for outputting the voice message stored in the voice message generating means to the first station, when the present facsimile machine is informed by the receiver facsimile machine that the receiver facsimile machine is successful in receiving the transmitted image information.

Additional objects, features and advantages of the present invention will become apparent from the following detailed description when read in conjunction with the accompanying drawings.

DESCRIPTION OF A PREFERRED EMBODIMENT

A description is given of a preferred embodiment of the present invention.

Figure 1:
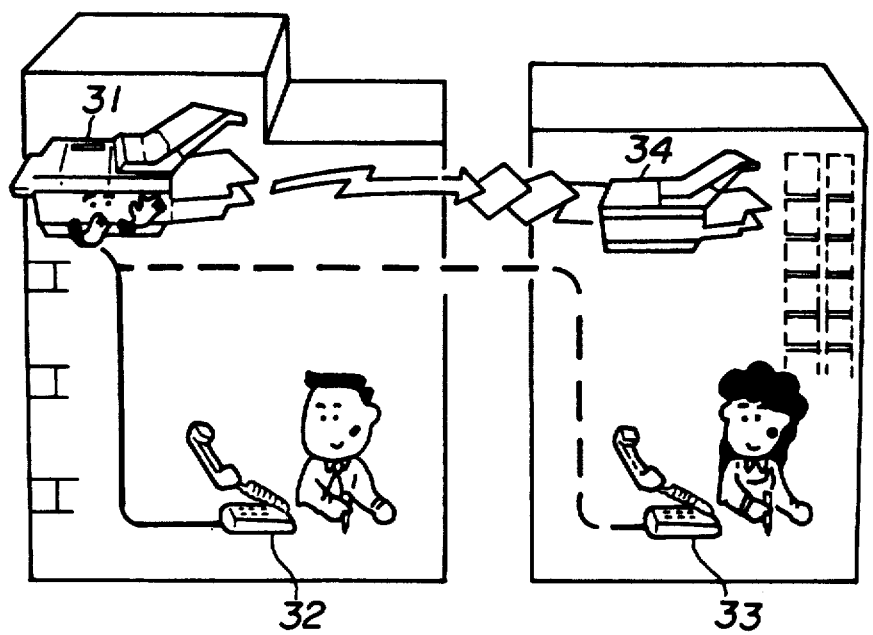
FIG. 1 is a diagram illustrating a conventional facsimile communication method.
Figure 2:
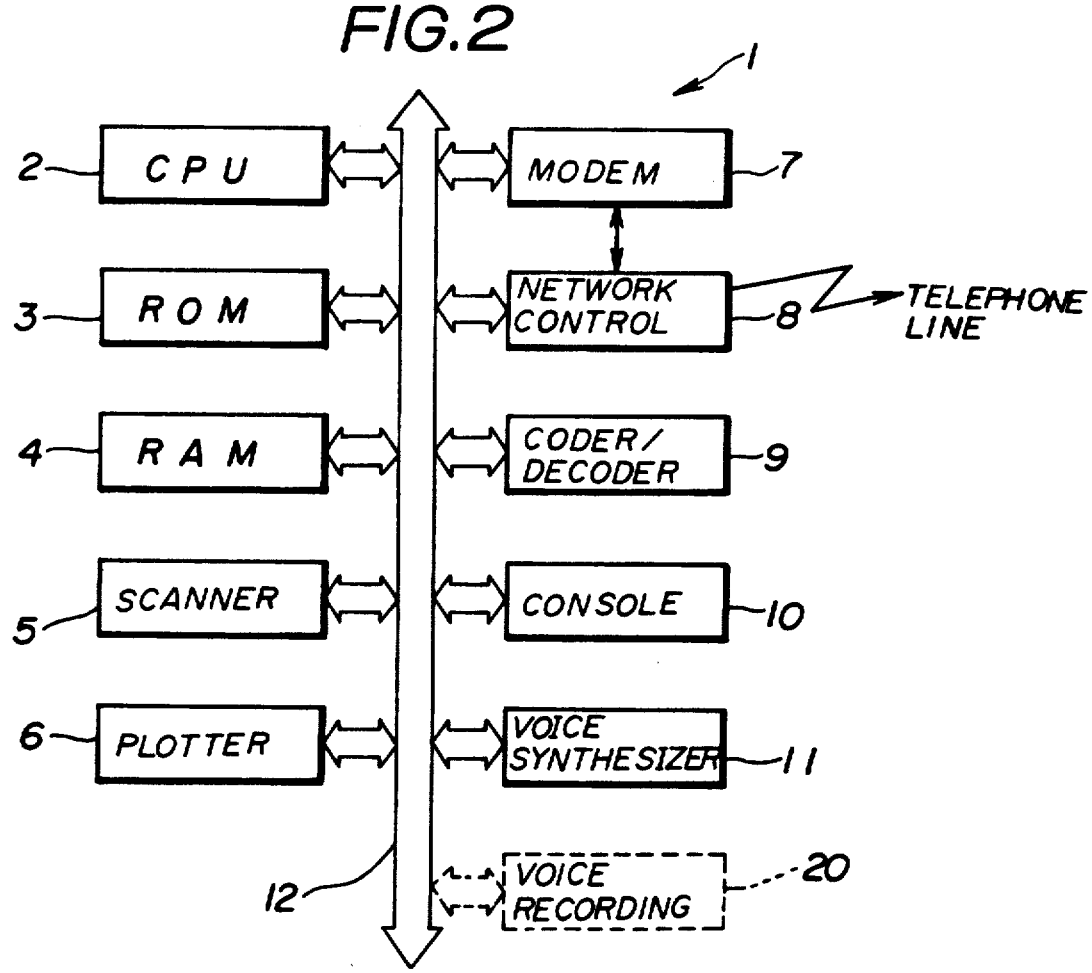
FIG. 2 is a block diagram of a facsimile machine according to a preferred embodiment of the present invention.

Referring to FIG. 2, a facsimile machine 1 is made of a central processing unit (hereinafter simply referred to as a CPU) 2, a read only memory (hereinafter simply referred to as a ROM) 3, a random access memory (hereinafter simply referred to as a RAM) 4, a scanner 5, a plotter 6, a modulator/demodulator (MODEM) 7, a network control unit 8, a coder/decoder 9, a console 10 and a voice synthesizer 11, all of which are connected to a bus 12.

The ROM 3 stores basic programs of the facsimile machine 1 and a voice message sending procedure program. The RAM 4 serves as a working area. The CPU 2 controls the illustrated structural elements and executes sequences of facsimile functions. Further, the CPU 2 executes a voice message sending procedure based on the related program stored in the ROM 3. The scanner 5 is a line image sensor which uses a charge coupled device, for example. The scanner 5 reads a document for every line and outputs corresponding image data. The plotter 6 is a thermal recording device, for example, and records an image directly on thermal recording paper or indirectly on plan paper through an ink ribbon.

The modulator/demodulator 7 modulates image data to form a signal suitable for transmission through an external line L (a public telephone line for example), and demodulates a signal supplied from the external line L to reproduce the original image data. The network control unit 8, which is generally called an AA-NCU, is connected to the external line L. The network control unit 8 automatically sets up a call and automatically terminates an incoming call transferred through the external line L. Further, the network control unit 8 functions as a communication controller, which exchanges facsimile control signals (procedure signals) with another facsimile machine coupled to the illustrated facsimile machine through the external line L and a network (not shown), and executes communication control procedures.

The coder/decoder 9 is provided for reducing the time it takes to transmit image information to enhance efficiency in transmitting image information. When sending image information, the coder/decoder 9 compresses (encodes) image information and facsimile control signals, and adversely expands (decodes) compressed image information and facsimile control signals when receiving the same. The console 10 includes operation keys such as ten keys and keys for inputting commands, and a display unit which displays, on a liquid crystal display for example, input commands and various messages to be given to an operator.

The voice synthesizer 11 includes a voice synthesis integrated circuit and a memory which stores voice data in the form of digital data. The memory further stores voice messages used at the time of transmission, such as "Please retransmit your document" and "Please retransmit a document of a document number xxx". Moreover, the memory provided in the voice synthesizer 11 stores voice messages used at the time of reception, such as "A facsimile has been delivered". The voice synthesizer 11 synthesizes voice messages stored in the memory under the control of the CPU 2 to form corresponding voices, which are output to the external line L through the network controller 8.

At the time of transmission, sheets of documents set in the scanner 5 are successively read from the top page thereof, and image information is formed. The image information is coded through the coder/decoder 9, and is then modulated through the modulator/demodulator 7. The coded and modulated image information is arranged in a format shown in FIG. 3 and is then output to the external line L through the network control unit 8.

At the time of reception, coded and modulated image information supplied from the external line L is demodulated through the modulator/demodulator 7, and is supplied to the coder/decoder 9. Then the demodulated image information is decoded through the coder/decoder 9, and is then supplied to the plotter 6, which prints a corresponding image on paper.

Figure 3:
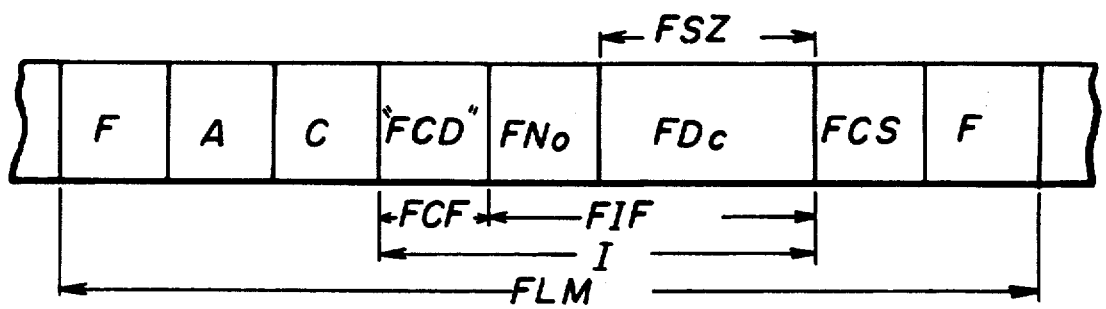
FIG. 3 is a diagram of a format of a signal transferred between facsimile machines.

A format of a signal exchanged between facsimile machines is illustrated in FIG. 3. Image information after coding and compressing image data is divided into sub-frames each having 256 bytes (1 byte amounts to 8 bits) or 64 bytes, for example. Then, as shown in FIG. 3, image information amounting to one frame is arranged into a frame FLM defined by a high-level data link control (HDLC) frame format. Each frame FLM consists of a (beginning) flag sequence F consisting of a predetermined bit pattern, an address field A consisting of a predetermined bit pattern (global address), a control field C consisting of a bit pattern inherent in the type of facsimile machines, an information field I, a frame check sequence FCS, and a (end) flag F. These contents of the HDLC frame formats are arranged in the above-mentioned order from the beginning of the frame FLM.

The information field I consists of a facsimile control field FCF in which a facsimile transmission procedure signal is defined, and a facsimile information field FIF in which there is defined a variety of information to be added to the facsimile transmission procedure signal. In the facsimile control field FCF, there is disposed facsimile coded data FCD of the facsimile transmission procedure signal. In the facsimile information field FIF, there are arranged a frame number FNo which represents the sequence of frames, and coded frame data FDc of one frame size FSZ. Since the frame number FNo consists of binary digits consisting of 8 bits, the frame number FNo is capable of representing consecutive numbers of only 0-255. For this reason, one block is defined with 256 consecutive frames. In the case where image information amounting to one page cannot be transmitted with one block, the remaining data is set in the next block and then transmitted.

Figure 4:
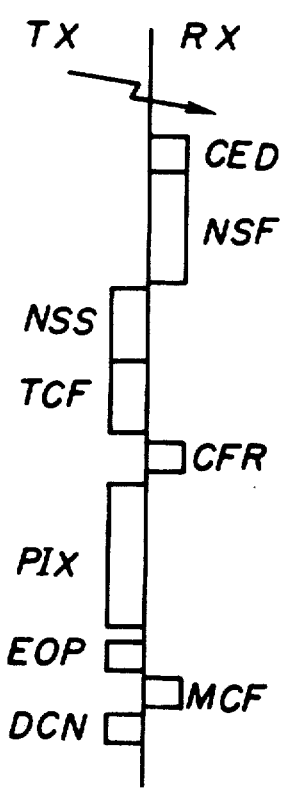
FIG. 4 is a diagram of a communication sequence related to a case where facsimile communication is successful.
Figure 5:
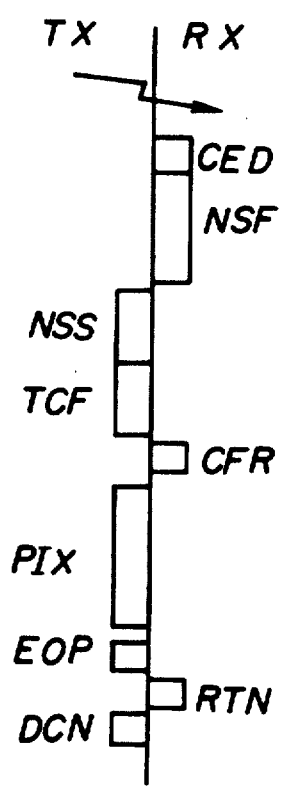
FIG. 5 is a diagram of a communication sequence related to a case where facsimile communication fails.

A description is now given of an operation of the facsimile machine 1 with reference to FIGS. 4 and 5. An essential feature of the present invention is characterized by informing a predetermined station (telephone) of a necessary voice message from one of the facsimile machines which is closer to the predetermined station than the other facsimile machine.

It is now assumed that the facsimile machine 1 shown in FIG. 2 is provided on each of the transmission and reception sides. A description is first given of a case where facsimile transmission is successful, by referring to FIG. 4. The facsimile machine 1 on the transmission side (hereinafter referred to as a transmitter TX) sets up a call. In response to the set-up call, the facsimile machine on the reception side (hereinafter referred to as a receiver RX) sequentially sends a called station identification signal (hereinafter simply referred to as a CED signal) and a non-standard facility signal (hereinafter simply referred to as an NSF signal). The NSF signal to be sent to the transmitter TX is given a specific bit, which indicates that the receiver RX has the voice message sending function. The specific bit may be included in the aforementioned facsimile information field FIF, for example.

In response to the CED and NSF signals, the transmitter TX sequentially sends a non-standard facilities set-up signal (hereinafter simply referred to as an NSS signal) and a training check frame signal (hereinafter simply referred to as a TCF signal). The NSS signal to be sent to the receiver RX includes the telephone number of a station (telephone) which is to be informed of a voice message by the receiver RX when facsimile communication has succeeded. The voice message used at this time indicates that facsimile communication has succeeded. The telephone number of the informed station is input by the operator through the console 10 before starting facsimile transmission. At this time, the operator inputs the telephone number of a station which is to be informed of a message by the transmitter TX when facsimile communication has failed. The voice message used at this time indicates failure of facsimile communication. The telephone numbers of the informed stations are stored in the RAM 4 of the transmitter TX.

When the receiver RX receives the NSS and TCF signals, the receiver RX extracts the telephone numbers of the informed stations from the received NSS signal. The extracted telephone numbers are stored in the RAM 4 of the receiver RX. When the receiver RX becomes ready for receiving image information, it sends the transmitter TX a confirmation signal (hereinafter simply referred to as a CFR signal), which indicates that the receiver RX has been ready for receiving image information.

In response to the CFR signal, the transmitter TX sends image information PIX. When the transmitter TX has completed transmission of image information PIX, it sends the receiver RX an end-of-procedure signal (hereinafter simply referred to as an EOP signal).

When the receiver RX receives image information PIX within a predetermined tolerance of errors, the CPU 2 of the receiver RX concludes that the present facsimile communication has succeeded. For example, the CPU 2 of the receiver RX determines whether facsimile transmission has succeeded by calculating the number of error frames. When the calculated number of frames is less than a predetermined number, the CPU 2 concludes that the present facsimile transmission has succeeded. Then the receiver RX sends a message confirmation signal (hereinafter simply referred to as an MCF signal). In response to the MCF signal, the transmitter TX sends a disconnect signal (hereinafter simply referred to as a DCN signal), and then disconnects the line being used.

When the line is disconnected, the receiver RX reads out the telephone number of the station (telephone) to be informed of the communication results from the RAM 4 provided therein, and calls out the station through the network controller 8. In most cases, a telephone which is located near the operator on the reception side is designated as the station. When the handset of the telephone is off-hooked, the voice synthesizer 11 of the receiver RX is made active, and a voice message such as "Facsimile has been delivered" is output through the telephone. Thus, the operator will know that a facsimile directed to the receiver RX has been received by the announced voice message.

A description is now given of a case where facsimile transmission fails with reference to FIG. 5. There are various reasons why facsimile communication fails. The following description relates to a case where facsimile communication fails on the grounds that a large number of errors are included in the received information.

When the receiver RX is called out by the transmitter TX, the receiver RX successively sends the CED signal and the NSF signal. Then the transmitter TX sends the NSS signal which lets the receiver RX know the telephone numbers of stations to be informed of the facsimile communication results. Subsequently, the transmitter TX sends the TCF signal.

When receiving the CFR signal, the transmitter Tx sends image information PIX and then the EOP signal. When the received image information PIX includes errors over the predetermined tolerance, the CPU 2 of the receiver RX concludes that the present facsimile communication has failed. Then the receiver RX sends a re-training reject signal (hereinafter simply referred to as an RTN signal). In response to the RTN signal, the transmitter TX disconnects the line being used, and calls out the telephone, the number of which has been stored in the RAM provided in the transmitter TX as a station to be informed of the communication results by the transmitter TX. In most cases, a telephone which is closer to the operator on the transmitter TX is selected as the station to be informed on the transmitter side. The CPU 2 of the transmitter TX activates the voice synthesizer 11 provided therein, and sends to the called-out telephone a synthesized voice message such as "Please retransmit facsimile". The operator on the transmitter side with then know that the present facsimile transmission has failed. Then the operator retransmits the document again, for example.

According to the present invention, either the transmitter TX or the receiver which is closer to a station to be informed of the results of facsimile transmission, can let the station know the results of facsimile transmission by a voice message so that the operator of the station can do necessary procedures based on whether the present facsimile transmission has succeeded. As a result, the cost of sending the results of facsimile communications can be considerably decreased.

In the aforementioned embodiment, predetermined voice messages are created through the voice synthesizer 11. In place of or together with the voice synthesizer 11, it is possible to utilize a voice recording device 20 as shown in FIG. 2. The operator records desired messages before starting facsimile transmission. For example, a message such that "XXX corporation". The recorded message is combined with a predetermined message created by the voice synthesizer 11 under the control of the CPU 2. Then a combined message such that "Please retransmit facsimile for XXX corporation" is sent to the telephone on the transmitter side. Alternatively, it is possible to record the entire message. In this case, the voice synthesizer 11 is made inactive. The above-mentioned message is convenient when image information is successively transmitted to a plurality of receivers.

The present invention is not limited to the aforementioned embodiment, and variations and modifications may be made without departing from the scope of the present invention.

What is claimed is:

1. A facsimile communication method comprising the steps of:
    transmitting image information from a transmitter facsimile machine to a receiver facsimile machine through a transmission line;
    determining whether said receiver facsimile machine is successful in receiving said transmitted image information, wherein said receiver facsimile machine sends a first signal to said transmitter facsimile machine upon a successful transmission of said image information and said receiver facsimile machine sends a second signal to said transmitter facsimile machine upon an unsuccessful transmission of said image information;

sending to a first station related to said receiver facsimile machine a first voice message from said receiver facsimile machine when the receiver facsimile machine is successful in receiving said transmitted image information and thus sends said first signal to said transmitter facsimile machine; and sending to a second station related to said transmitter facsimile machine a second voice message from said transmitter facsimile machine in response to said transmitter facsimile machine receiving said second signal from said receiver facsimile machine indicating that transmission of said image information is unsuccessful.

2. A facsimile communication method as claimed in claim 1, further comprising the step of inputting telephone numbers of said first and second stations through said transmitter facsimile machine.

3. A facsimile communication method as claimed in claim 2, further comprising the step of sending said input telephone number of said second station to said receiver facsimile machine before transmitting said image information to said receiver facsimile machine.

4. A facsimile communication method as claimed in claim 1, wherein said first voice message includes information indicating that facsimile transmission has succeeded.

5. A facsimile communication method as claimed in claim 1, wherein said second voice message includes information indicating that facsimile transmission has failed.

6. A facsimile communication method as claimed in claim 1, wherein each of said first station and second stations is a telephone.

7. A facsimile communication method as claimed in claim 1, wherein the determining step determines whether the receiver facsimile machine is successful in receiving the transmitted image information by determining whether the received facsimile information has a number of errors which is equal to or larger than a predetermined tolerance number of errors.

8. A facsimile communication method as claimed in claim 1, further comprising the step of retransmitting said image information to said receiver facsimile machine when said second voice message is announced through said second station.

9. A facsimile machine comprising:

scanning means for scanning a document and outputting image information;

memory means for storing a telephone number of a first station used when said facsimile machine serves as a receiver, and a telephone number of a second station used when said facsimile machine serves as a transmitter;

voice message generating means for generating a first voice message to be used when said facsimile machine service as the receiver is successful in receiving image information, and a second voice message to be used when a receive-side facsimile machine is unsuccessful in receiving said image information transmitted from said facsimile machine serving as the transmitter, wherein said facsimile machine serving as the receiver sends a first signal to said facsimile machine serving as the transmitter upon a successful transmission of said image information and said facsimile machine serving as the receiver sends a second signal to said facsimile machine serving as the transmitter upon an unsuccessful transmission of said image information;

communication means for exchanging data with a transmission line to which said facsimile machine is coupled, said data including said image information, the telephone number of said first station and the telephone number of said second station;

recording means for recording image information received through said communication means on a recording medium; and voice message outputting means for reading out the telephone number of said first station stored in said memory means and outputting said first voice message stored in said voice message generating means to said first station when said facsimile machine serving as the receiver is successful in receiving said image information and thus sends said first signal to said facsimile machine serving as the transmitter and for reading out the telephone number of said second station stored in said memory means and outputting said second voice message to said second station in response to said facsimile machine serving as the transmitter receiving said second signal from said receive-side facsimile machine, indicating that transmission of said image information is unsuccessful.

10. A facsimile machine as claimed in claim 9, further comprising input means for inputting the telephone numbers of said first and second stations to be stored in said memory means.

11. A facsimile machine as claimed in claim 9, wherein said voice message generating means includes a voice synthesizer.

12. A facsimile machine as claimed in claim 9, wherein said voice message generating means includes a voice recording device.

13. A facsimile machine as claimed in claim 9, wherein said voice message generating means includes a voice synthesizer providing a first output and a voice recording device providing a second output, and wherein each of said first and second voice messages is generated by combining said first and second output signals derived from said voice synthesizer and said voice recording device.

14. A facsimile machine as claimed in claim 9, wherein said first voice message shows that said facsimile machine serving as the receiver has successfully received said image information.

15. A facsimile machine as claimed in claim 9, wherein said second voice message shows that said receive-side facsimile machine has failed to receive said image information.

* * * * *